(12) United States Patent
Ejima

(10) Patent No.: US 8,365,268 B2
(45) Date of Patent: Jan. 29, 2013

(54) WIRELESS COMMUNICATION SYSTEM, WIRELESS HOST, AND WIRELESS DEVICE

(75) Inventor: Takeshi Ejima, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 304 days.

(21) Appl. No.: 12/816,696

(22) Filed: Jun. 16, 2010

(65) Prior Publication Data

US 2011/0004920 A1    Jan. 6, 2011

(30) Foreign Application Priority Data

Jul. 3, 2009   (JP) ................................ 2009-158600

(51) Int. Cl.
*H04L 29/06* (2006.01)
(52) U.S. Cl. ................................ 726/9; 455/41.2; 726/3
(58) Field of Classification Search .................. 726/3, 9; 455/41.2
See application file for complete search history.

(56) References Cited

U.S. PATENT DOCUMENTS

| | | | |
|---|---|---|---|
| 6,912,651 B1* | 6/2005 | Hamdi et al. ........................ | 713/1 |
| 2005/0266798 A1* | 12/2005 | Moloney et al. ............. | 455/41.2 |
| 2008/0222711 A1* | 9/2008 | Michaelis ........................... | 726/7 |
| 2010/0011408 A1* | 1/2010 | Bhattacharyya et al. ........... | 726/1 |

FOREIGN PATENT DOCUMENTS

| | | |
|---|---|---|
| JP | 2007-166538 | 6/2007 |
| JP | 2008-72533 | 3/2008 |
| JP | 2008-160856 | 7/2008 |

OTHER PUBLICATIONS

Turab, "A comparison between wireless LAN security protocols," U.P.B. Scientific Bulletin, Series C, vol. 71, Issue 1, 2009.*

* cited by examiner

*Primary Examiner* — Kambiz Zand
*Assistant Examiner* — Michael Guirguis
(74) *Attorney, Agent, or Firm* — Oblon, Spivak, McClelland, Maier & Neustadt, L.L.P.

(57) ABSTRACT

A wireless communication system includes a wireless host and a wireless device. The wireless device includes a user authentication unit that authenticates a requesting user that is using the wireless host based on a result of comparison between a requesting-user ID of the requesting user received from the host and a user ID of a user that is permitted to establish communication with the wireless device. When the requesting user is authenticated by the user authentication unit, information required prior to connection is stored in the wireless device and the wireless host. The wireless device permits to continue the association process with the wireless host, when the information required prior to connection received from the wireless host and the information required prior to connection stored in the wireless device match.

14 Claims, 13 Drawing Sheets

| USER ID | PASSWORD |
|---|---|
|  |  |
|  |  |
| ⋮ | ⋮ |

| USER ID | CHID_AS |
|---------|---------|
|         |         |
|         |         |
| ⋮       | ⋮       |

| ELEMENT | | SIZE | DESCRIPTION |
|---|---|---|---|
| CC (Connection Context) | CHID (Connection Host ID) | 128 BITS | ID FOR USE IN IDENTIFYING WIRELESS USB HOST |
| | CDID (Connection Device ID) | 128 BITS | ID FOR USE IN IDENTIFYING WIRELESS USB DEVICE |
| | CK (Connection Key) | 128 BITS | KEY TO BE USED FOR CREATING PAIRWISE TEMPORAL KEY (PTK) IN 4-WAY HANDSHAKE |

WIRELESS COMMUNICATION SYSTEM, WIRELESS HOST, AND WIRELESS DEVICE

CROSS-REFERENCE TO RELATED APPLICATIONS

The present application claims priority to and incorporates by reference the entire contents of Japanese Patent Application No. 2009-158600 filed in Japan on Jul. 3, 2009.

BACKGROUND OF THE INVENTION

1. Field of the Invention

The present invention is directed generally to a wireless communication system, a wireless host, and a wireless device, in particular, is directed to a wireless USB host, and a wireless USB device for carrying out wireless communication in compliance with wireless USB standard.

2. Description of the Related Art

Wireless universal serial bus (USB) is a technical standard that is introduced as an extension of the USB, which is widely used as a standard for wired, short-range communications, and that provides ease of use of wireless communication while preserving security and speed of wired communications. Specification for wireless USB has been defined by the Wireless USB Promoter Group, which is a lower branch of the USB-Implementers Forum (USB-IF).

Wireless USB employs a wireless technology called Ultrawideband (UWB). UWB operates in a broad spectrum of 3.1 to 10.6 gigahertz (GHz). IEEE 802.15.3a Task Group in the Institute of Electrical and Electronic Engineers (IEEE) formulating standards works for standardization of the physical layer of UWB. There are two modulation approaches, specifically Direct Spread-UWB (DS-UWB) and Multiband-Orthogonal Frequency Division Multiplexing (MB-OFDM), for the physical layer of UWB.

In DS-UWB, two bands (dual band), or specifically, a low band of from 3.1 to 4.9 GHz and a high band of from 6.2 to 9.7 GHz are used. Data transmission is performed by performing primary modulation by using quadrature phase shift keying (QPSK) or binary phase shift keying (BPSK), and thereafter secondary modulation by using code division multiple access (CDMA). At this time, the data transmission is performed by using direct-sequence spread-spectrum technique.

In MB-OFDM, the spectrum of from 3.1 to 10.6 GHz is divided into 14 bands (frequency bands). For each band, primary modulation is performed by QPSK to thereby superimpose digital signals on radio waves first. Subsequently, secondary modulation is performed by OFDM to realize communication that is highly tolerant to interference with other radio waves. Specification for MB-PFDM physical (PHY) layer has been defined as the WiMedia PHY by a group called the WiMedia Alliance.

By performing modulation by using these modulation methods, transmitting electric power consumption per megahertz (MHz) is lowered in the UWB. Specifically, the Federal Communications Commission (FCC) has defined that the equivalent isotropic radiated power (EIRP), which denotes a limit of transmitting electric power consumption level for UWB communications, per megahertz is to be equal to or below −41.25 decibel per milliwatt (dBm). This can be converted into total electric power of approximately 0.5 milliwatt (mW), which is approximately one-twentieth of that of IEEE 802.11b wireless LAN and personal handy-phone system (PHS), which is 10 [mW].

The WiMedia Alliance has defined protocol for the media access control (MAC) layer as the WiMedia MAC. Wireless USB is based on wireless technologies, or specifically the WiMedia PHY and the WiMedia MAC, and incorporates USB technology based on the Universal Serial Bus Specification Revision 2.0 (USB 2.0 specification) defined by the USB-IF for wired communication. Accordingly, if the communication range is equal to or less than three meters, wireless USB allows data transfer of 480 megabits per second (Mbps), which is the maximum data transfer rate of the wired USB 2.0.

Wireless USB has low transmitting power consumption, which is one of characteristics of UWB. Hence, wireless USB is ranked as a personal area network (PAN) where radio waves are assumed to reach a range of up to 10 meters. Wireless USB can be said to be, in addition to providing higher data throughput, less susceptible to eavesdropping, and more secure than wireless LAN.

However, because wireless USB is one of the wireless communications technologies, a disadvantageous case that, for instance, a user that has not an access right or a permission accesses a file in a storage, which corresponds to a wireless USB device, without being noticed by an authorized user can occur. To this end, a wireless USB desirably has a function of authenticating an authorized user.

In wireless USB, the authentication is performed by using what is called a 4-way handshake scheme illustrated in FIG. 15 between a wireless USB host and a wireless USB device. The 4-way handshake is performed using four messages, or specifically, a message 1, a message 2, a message 3, and a message 4. The wireless USB host and the wireless USB device shares a connection key (CK) before the 4-way handshake is started. The wireless USB host generates a random number called HNonce; the wireless USB device generates a random number called DNonce. As the message 1, the wireless USB host transmits the HNonce to the wireless USB device (Step S400). The wireless USB device calculates a pairwise temporary key (PTK) by combining its own DNonce, the received HNonce, and the CK together (Step S402) based on a predetermined equation. The thus-obtained PTK is utilized as an encryption key in data transfer to be performed later.

Similarly, as the message 2, the wireless USB device transmits the DNonce to the wireless USB host (Step S404). The wireless USB host calculates a PTK by combining the received DNonce, its own HNonce, and the CK together (Step S406) based on the same equation. Thereafter, the PTK calculated by the wireless USB host is sent out by the wireless USB host as the message 3 (Step S408), and the PTK calculated by the wireless USB device is sent out by the wireless USB device as the message 4 (Step S410). The wireless USB host and the wireless USB device individually determine whether the calculated PTK and the received PTK has match (Step S412, Step S414). If the two PTKs match (Yes at Step S412, Yes at Step S414), communication between the wireless USB host and the wireless USB device is started. Authentication by using the 4-way handshake is performed in this manner. In this way, the 4-way handshake premises that a CK is pre-shared between a wireless USB host and a wireless USB device.

As illustrated in FIG. 16, a CK is defined in the Wireless Universal Serial Bus Specification, Revision 1.0 (hereinafter, "wireless USB 1.0 specification") as a component that, together with a connection host identifier (CHID) serving as an identifier of the wireless USB host and a connection device identifier (CDID) serving as an identifier of the wireless USB device, constitutes a connection context (CC). The CK is shared between the host and the device as a result that the CC is shared therebetween prior to authentication. In the wireless USB 1.0 specification, the term "association" is used to describe a series of operations that are performed to share a CC. Specification of the association is defined in Association Models Supplement to the Certified Wireless Universal Serial Bus Specification (hereinafter, "association specification"), which is a supplemental document of wireless USB.

In the association specification, two association models, more specifically the Cable Association Model and the Numeric Association Model, are described.

In the Cable Association Model, first-time association between a wireless USB host and a wireless USB device is performed by using a USB cable in a wired manner. The wireless USB host provides the wireless USB device with a CC via the USB cable. This causes the CC to be shared between the host and the device.

In contrast, in the Numeric Association Model, at first-time association between a wireless USB host and a wireless USB device, buttons, provided on each of the device and host, for starting association are pressed, and then each of the wireless USB host and the wireless device generates a random number. The host and the device exchange the random numbers by radio waves. Each of the wireless USB host and the wireless USB device displays a numeric value calculated from the random number generated by itself and the received random number by using a predetermined equation. A user checks whether the numeric values displayed on the wireless USB host and the wireless USB device match. If the numeric values match, buttons, which are provided on the wireless USB host and the wireless USB device, for permitting association are independently pressed. Thereafter, the wireless USB host provides the wireless USB device with a CC by radio waves, whereby the CC is shared between the device and the host.

However, each of the two association model has disadvantage discussed below. With the Cable Association Model, it is an essential condition that a wired USB port is additionally provided on each side of the wireless USB host and the wireless USB device. Furthermore, connection with a cable is troublesome. Meanwhile, with the Numeric Association Model, it is an essential condition that each of the wireless USB host and the wireless USB device includes a display. This makes the Numeric Association Model less appropriate for adoption into a small device, such as USB memory.

In view of the above circumstances, Near Field Communication Association Model (hereinafter, "NFC") is defined as a new association model in the wireless USB 1.1 specification, which is a currently drafted specification as a succeeding version of the wireless USB 1.0. NFC is a short-range two-way wireless communication standard that allows communication at a rate of from 100 to 400 kilobits per second (Kbps) over a short distance of approximately 10 centimeters by using radio waves of the 13.56 MHz. NFC is a communication technology that has originally been used in contactless IC cards for use in an automatic checking and collecting machine in a station, or the like. Because NFC was approved as an international standard as ISO/IEC 18092, NFC can proliferate in electronics products, such as audio equipment, for general end consumers.

Using NFC as one of association models for providing a CC from a wireless USB host to a wireless USB device is contemplated in wireless USB technology. Specifically, this scheme is performed such that, if it is desired that data in a notebook personal computer (PC) corresponding to a wireless USB host is printed by a printer corresponding to a wireless USB device, the notebook PC and the printer are brought into a range of 10 centimeters or less, thereby causing the notebook PC and the printer to share a CC by NFC.

As one of such techniques that use NFC, a technique directed to wireless local area network (LAN) technology is disclosed in Japanese Patent Laid-open Publication No. 2007-166538. According to this technique, communication methods supported by two wireless LAN communication devices are determined by using NFC, first. If the communication methods match, communication is carried out by using the communication method; if the communication methods do not match, communication is carried out by NFC. Another technique of causing two wireless communication devices to carry out communication by NFC first, and, if the two wireless communication devices support higher-speed communication protocol, such as Bluetooth®, switching communication protocol to the higher-speed communication protocol is disclosed in Japanese Patent Laid-open Publication No. 2008-160856. A technique that uses NFC in Device Wire Adapter (DWA) is disclosed in Japanese Patent Laid-open Publication No. 2008-72533. DWA acts as an adapter that converts data, in order to communicate data from external equipment, which is connected to a USB connector, by wireless USB communication.

As discussed above, NFC is an association model that complements disadvantages of the Cable Association Model and the Numeric Association Model. However, operation to be performed to verify whether a wireless USB host that has attempted association is an authorized wireless USB host is not defined in NFC.

Hence, such a situation that a user of a wireless USB host who is not given an access right to a wireless USB device that employs NFC as its association model establishes association with the wireless USB device by NFC in a sneaky manner when the user is unaccompanied by other people can occur. This allows the user that is not given an access right to deliver a CC to the wireless USB device and carry out communication between the wireless USB host and the wireless USB device, which is undesirable.

For instance, assume that a laboratory in a university has a printer corresponding to a wireless USB device that employs NFC for an association model. It is highly possible that a room where the printer is installed is left unlocked in many cases because of the way the printer is used. Under such a condition, there can occur such an undesirable situation that, for instance, due to a meeting attended by all members of the laboratory held in another room, the room where the printer is installed is emptied continuously for several hours, during which an outsider, such as a staff of another laboratory, carries a notebook PC into the room, establishes association with the printer without permission, and performs a large amount of printing by using the printer.

The present invention has been conceived in view of the above circumstances and aims at providing a wireless communication system, a wireless host, a wireless device, and a wireless communication method capable of restricting association to be established between a wireless host and a wireless device in response to an instruction issued by a user of a wireless host who does not have an access right to the wireless device.

SUMMARY OF THE INVENTION

It is an object of the present invention to at least partially solve the problems in the conventional technology.

According to an aspect of the present invention there is provided a wireless communication system including a wireless host that issues a request for wireless communication; and a wireless device that receives the request. The wireless host includes a communication unit that transmits, before transmitting a communication request that requests wireless communication with the wireless device to the wireless device, a requesting-user ID for identification of a requesting user that is using the wireless host. The wireless device includes a communication unit that receives the requesting-user ID from the wireless host; a user-ID storing unit that stores a user ID of a user that is permitted to establish communication with the wireless device; a user authentication unit that authenticates the requesting user based on a result of comparison between the requesting-user ID received by the communication unit of the wireless device and the user ID stored in the user-ID storing unit; and an information required prior to connection storing unit that stores, when the requesting user is authenticated by the authentication unit, information required prior to connection that indicates that the requesting user is authenticated. When the requesting user is authenticated by the user authentication unit, the communication unit of the wireless device transmits the information required prior to connection to the wireless host. The communication unit of the wireless host transmits the information required prior to connection to the wireless device in an association process for wireless connection with the wireless device. The wireless device further includes an information required prior to connection verifying unit that compares the information required prior to connection received by the wireless device and the information required prior to connection stored in the information required prior to connection storing unit. When the information required prior to connection received by the wireless device and the information required prior to connection stored in the information required prior to connection storing unit match, the communication unit of the wireless device continues the association process with the wireless host.

According to another aspect of the present invention there is provided a wireless host that issues a request for wireless communication to a wireless device. The wireless host includes a communication unit that transmits, before transmitting a communication request that requests wireless communication with the wireless device to the wireless device, a requesting-user ID for identification of a requesting user that is using the host; and an information required prior to connection storing unit that stores, when the communication unit receives an information required prior to connection that indicates that the requesting user has been authenticated from the wireless device, the information required prior to connection. The communication unit transmits the information required prior to connection to the wireless device in an association process for wireless connection with the wireless device, and when continuance of the association process is permitted by the wireless device, the communication unit continues the association process.

According to still another aspect of the present invention there is provided a wireless device that receives a request for wireless communication from a wireless host. The wireless device includes a communication unit that receives a requesting-user ID for identification of a requesting user that uses the wireless host from the wireless host; a user-ID storing unit that stores a user ID of a user that is permitted to establish communication with the wireless device; a user authentication unit that authenticates the requesting user based on a result of comparison between the requesting-user ID received by the communication unit and the user ID stored in the user-ID storing unit; and an information required prior to connection storing unit that stores, when the requesting user is authenticated by the user authentication unit, information required prior to connection that indicates that the requesting user has been authenticated. When the requesting user is authenticated by the user authentication unit, the communication unit transmits the information required prior to connection to the wireless host. The wireless device further includes an information required prior to connection verifying unit that compares the information required prior to connection received by the wireless device and the information required prior to connection stored in the information required prior to connection storing unit in an association process for wireless connection with the wireless host. When the information required prior to connection received by the wireless device and the information required prior to connection stored in the information required prior to connection storing unit match, the communication unit continues the association process with the wireless host.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a diagram illustrating elements constituting a CK.

DETAILED DESCRIPTION OF THE PREFERRED EMBODIMENTS

Exemplary embodiments of a wireless communication system, a wireless host, a wireless device, and a wireless communication method according to the present invention are described in detail below with reference to the accompanying drawings.

Figure 1:
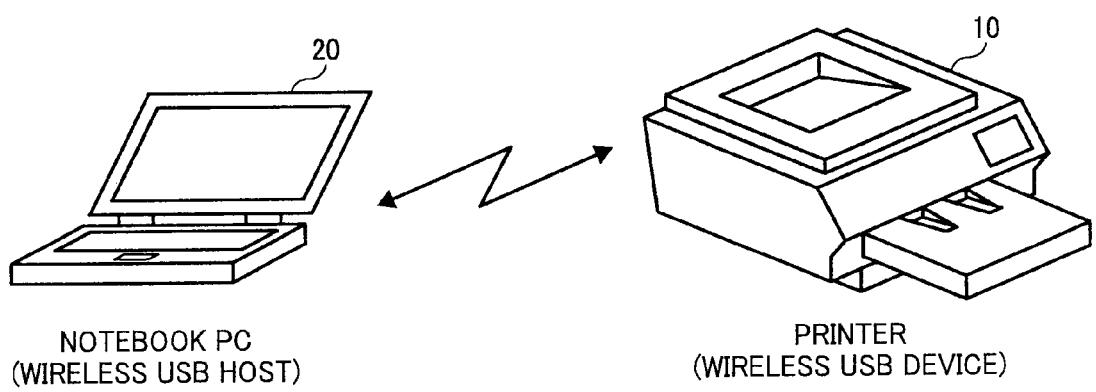
FIG. 1 is a schematic diagram illustrating an overall configuration of a wireless communication system 1.

FIG. 1 is a schematic diagram illustrating an overall configuration of a wireless communication system 1 according to an embodiment of the present invention. The wireless communication system 1 includes a printer 10 corresponding to a wireless USB device and a notebook PC 20 corresponding to a wireless USB host. The printer 10 and the PC 20 carry out wireless communication by using ultra-wideband (UWB) technology. The printer 10 and the PC 20 further perform 4-way handshake as a method of authenticating a wireless USB host, and employs near field association model (NFC) as a specification of association to be established in order to share a CC for use in the 4-way handshake. The printer 10 and the PC 20 according to the present embodiment perform operations to put restriction on NFC association attempted by the printer 10.

Figure 2:
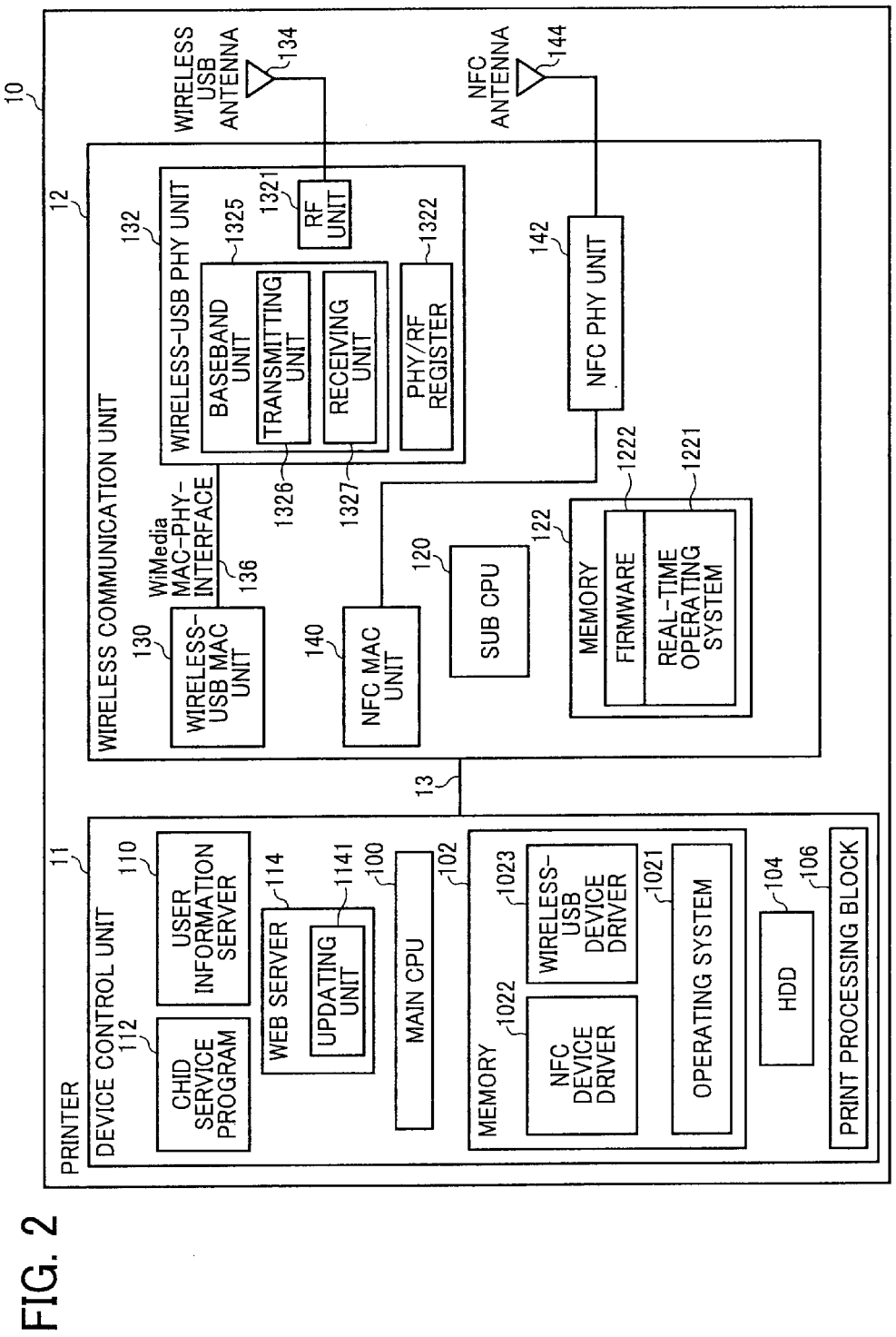
FIG. 2 is a schematic diagram illustrating a hardware configuration of a printer 10.

FIG. 2 is a schematic diagram illustrating a main hardware configuration of the printer 10. The printer 10 includes a device control unit 11 and a wireless communication unit 12. The device control unit 11 includes a main central processing unit (CPU) 100, a memory 102, a hard disk drive (HDD) 104, a print processing block 106, a user information server 110, a CHID service program 112, and a Web server 114.

The main CPU 100 causes operating system (OS) 1021 to be executed by using the memory 102, and causes an NFC device driver 1022 and a wireless-USB device driver 1023 to be executed on the OS 1021. The main CPU 100 also performs processing of the print processing block 106, which is an essential function of the printer.

The HDD 104 is provided to store the OS 1021, the NFC device driver 1022, the wireless-USB device driver 1023, and the like. The HDD 104 also stores a CDID for identification of the wireless USB device, or specifically, the printer 10. The CDID is information to be used in an association process.

The NFC device driver 1022 exchanges data with the wireless communication unit 12 via a bus 13. The NFC device driver 1022 further controls the wireless communication unit 12 by writing and reading values to and from a register in an NFC MAC unit 140, which will be described later. Similarly, the wireless-USB device driver 1023 exchanges data with the wireless communication unit 12 via the bus 13, and controls the wireless communication unit 12 by writing and reading values to and from a register in a wireless-USB MAC unit 130, which will be described later.

The user information server 110 determines whether a requesting user of the PC 20 is an authorized user. In this context, the requesting user is a user that requests communication with the printer 10 by using the PC 20. Meanwhile, an authorized user is a user that is permitted to use the printer 10 by, for instance, a system administrator, and for whose identification information of a user ID is pre-stored in the user information server 110.

Figures 3, 4:
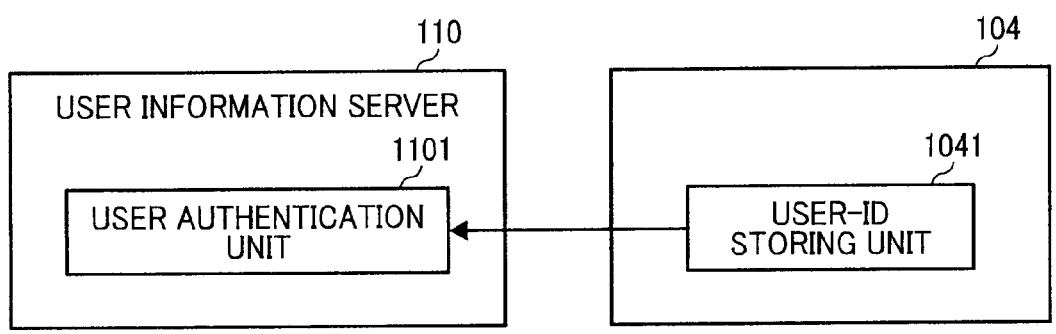
FIG. 3 is a block diagram illustrating a functional structure of a user information server 110.
FIG. 4 is a diagram schematically illustrating a data structure of a user-ID storing unit 1041.

FIG. 3 is a block diagram illustrating a functional structure of the user information server 110. The user information server 110 includes a user authentication unit 1101, and performs authentication of the requesting user of the PC 20 by making an access to the HDD 104. The HDD 104 includes a user-ID storing unit 1041. As illustrated in FIG. 4, the user-ID storing unit 1041 stores user IDs and passwords such that they are associated with each other. The user authentication unit 1101 of the user information server 110 obtains a user ID and a password of the requesting user from the PC 20 via the wireless communication unit 12, and compares a combination of the user ID and the password obtained from the PC 20 with a combination of a user ID and a password that are stored in the user information server 110 so as to be associated with each other. If the two combinations match, the user authentication unit 1101 determines the requesting user is authenticated. In contrast, if the two combinations do not match, the user authentication unit 1101 determines that the requesting user is not authenticated. The user information server 110 passes the result of the authentication to the CHID service program 112.

Alternatively, the user authentication unit 1101 can perform authentication of the requesting user based on a result of comparison between the user ID of the requesting-user received from the PC 20 and the user ID stored in the user-ID storing unit 1041. In this case, it is not necessary to store the passwords in the user-ID storing unit 1041.

The CHID service program 112 illustrated in FIG. 2 is computer program dedicated to establishment of association and provides a CHID to be used by Common Gateway Interface (CGI) only in an NFC association process. The CHID is information for identification of the wireless USB host, or specifically, the PC 20. In the following discussion, a CHID to be used only in the NFC association process is referred to as a CHID_AS. Note that CHID_AS is information that differs from CHID contained in information exchanged by internal wireless USB communication. The CHID is information pre-stored in the PC 20 as information for identification of the PC 20, whereas CHID_AS is information that differs from the CHID and is information issued by the CHID service program 112 in response to a request issued from the PC 20.

Figure 5:
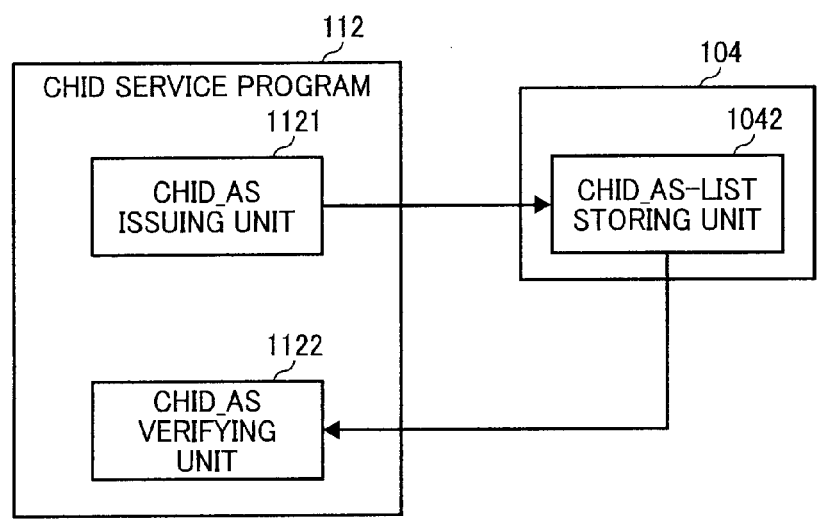
FIG. 5 is a block diagram illustrating a functional structure of a CHID service program 112.

FIG. 5 is a block diagram illustrating a functional structure of the CHID service program 112. The CHID service program 112 includes a CHID_AS issuing unit 1121 and a CHID_AS verifying unit 1122. When the CHID_AS issuing unit 1121 is notified by the user authentication unit 1101 of a result of authentication that the requesting user has been authenticated, the CHID_AS issuing unit 1121 issues a CHID_AS. Specifically, a CHID_AS is authentication completion information (wireless USB host identifying information or information required prior to connection) that indicates that the requesting user has been authenticated and serves as information for identification of a series of operations performed by the user authentication unit 1101 and the CHID_AS issuing unit 1121. Put another way, every CHID_AS issued by the CHID_AS issuing unit 1121 is a unique information piece.

Figure 6:
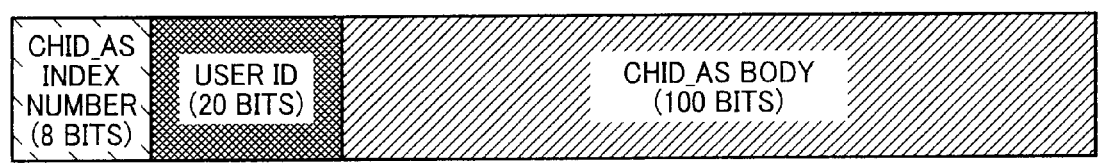
FIG. 6 is a schematic diagram illustrating a data structure of CHID_AS.

FIG. 6 is a diagram schematically illustrating the data structure of CHID_AS. A CHID_AS is 128-bit data. A CHID_AS index number is assigned to first 8 bits by the CHID_AS issuing unit 1121. The CHID_AS index number is a number that is incremented by one for each issuance of CHID_AS. Put another way, the CHID_AS index number is an authentication ID for identification of a specific authentication operation performed by the user authentication unit 1101. A user ID is assigned to the next 20 bits. The user ID is a user ID of the requesting user authenticated by the user authentication unit 1101. A CHID_AS body is assigned to 100 bits that follow the user ID. In this way, because a CHID_AS includes a user ID of the requesting-user, the requesting user that has requested issuance of the CHID_AS can be identified based on the CHID_AS.

Figures 7, 8:
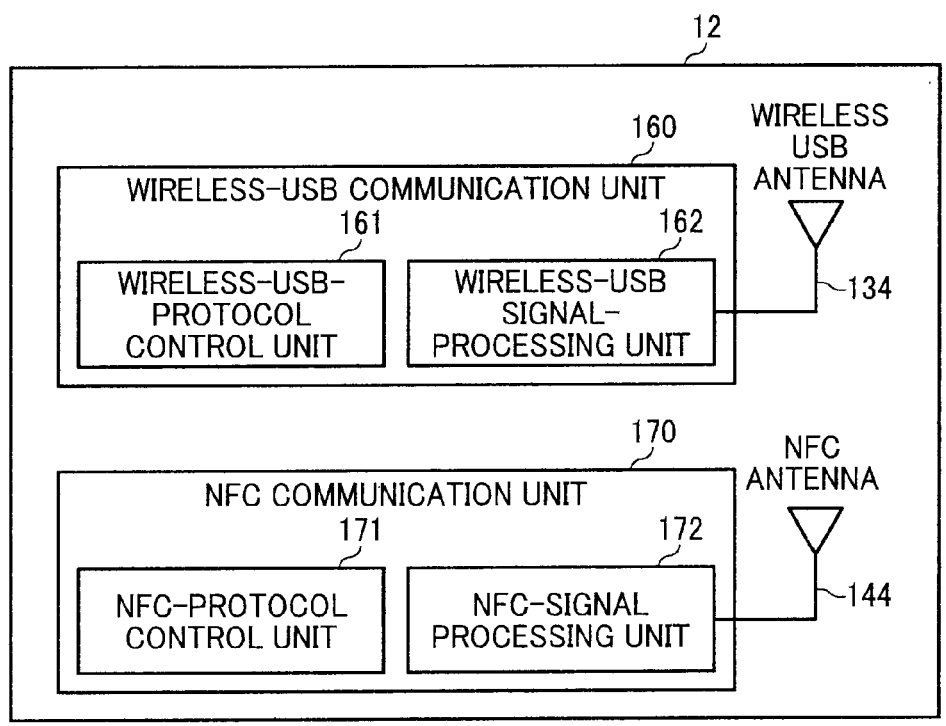
FIG. 7 is a diagram schematically illustrating a data structure of a CHID_AS-list storing unit 1042.
FIG. 8 is a functional block diagram of a wireless communication unit 12 illustrated in FIG. 2.

The CHID_AS issued by the CHID_AS issuing unit 1121 is stored in a CHID_AS-list storing unit 1042 in the HDD 104. FIG. 7 is a diagram schematically illustrating the data structure of the CHID_AS-list storing unit 1042. The CHID_AS-list storing unit 1042 stores user IDs of requesting-users and CHID_ASs such that they are associated with each other. The CHID_AS issued by the CHID_AS issuing unit 1121 is also transmitted to the PC 20 via the wireless communication unit 12. The CHID_AS is information that is requested by the printer 10 to the PC 20 in an NFC association process that is performed to establish communication with the printer 10. In other words, the printer 10 determines whether the requesting user of the PC 2) is an authorized user based on the CHID_AS.

In the NFC association process, the CHID_AS verifying unit 1122 of the CHID service program 112 compares the CHID_AS obtained from the PC 20 via the wireless communication unit 12 and the CHID_AS stored in the CHID_AS-list storing unit 1042, thereby verifying the CHID_AS. Put another way, the CHID_AS verifying unit 1122 serves as an authentication completion information verifying unit (a wireless USB host identifying information verifying unit or an information required prior to connection verifying unit).

The Web server 114 illustrated in FIG. 2 has a function of responding to an access made via Web browsers by an applicant for use of the printer 10 and an administrator of the printer 10. Put another way, the Web server 114 functions as an input receiving unit that receives an input entered by the administrator, or the like. The Web server 114 performs operations for authentication of a requesting user, issuance of a CHID_AS, verification of a CHID_AS, and the like in coordination with the user information server 110 and the CHID service program 112. The Web server 114 also makes settings as to whether to perform authentication of a requesting user by using a CHID_AS. The Web server 114 includes an updating unit 1141. The updating unit 1141 receives an instruction from the administrator of the printer 10, and performs update operation, such as addition, deletion, and/or modification of a user ID and a password to, from, and/or in the user-ID storing unit 1041 according to the instruction.

The wireless communication unit 12 includes a sub CPU 120, a memory 122, the wireless-USB MAC unit 130, a wireless-USB PHY unit 132, a wireless USB antenna 134, the NFC MAC unit 140, an NFC PHY unit 142, and an NFC antenna 144.

The sub CPU 120 executes real-time OS 1221 by using the memory 122, and causes firmware 1222 for use in controlling various units of the wireless-USB MAC unit 130 to be executed on the real-time OS 1221.

Specifically, the sub CPU 120 makes settings of the register, which is not illustrated, of the wireless-USB MAC unit 130 and performs data transmission and reception to and from the device control unit 11, and the like. The sub CPU 120 also reads and writes values from and to a PHY/RF register 1322, which will be described later, of the wireless-USB PHY unit 132 via a WiMedia MAC-PHY-interface bus 136.

Each of the wireless-USB MAC unit 130 and the wireless-USB PHY unit 132 performs operations in compliance with the WiMedia MAC Specification and the WiMedia PHY Specification, respectively. Communication between the wireless-USB MAC unit 130 and the wireless-USB PHY unit 132 is defined in the WiMedia MAC-PHY Interface Specification. Hence, it is also allowed to establish connection by using another wireless-USB MAC unit 130 and another wireless-USB PHY unit 132 provided by another vendor.

The wireless-USB MAC unit 130 performs processes of generation of a data frame for use in wireless USB communication, data frame filtering, and the like. Specifically, the wireless-USB MAC unit 130 adds a MAC header to a data frame to be transmitted to the wireless-USB PHY unit 132. The wireless-USB MAC unit 130 further encrypts the data frame, to which the MAC header has been added. The wireless-USB MAC unit 130 transmits the thus-encrypted data frame to the wireless-USB PHY unit 132 via the WiMedia MAC-PHY-interface bus 136.

The wireless-USB MAC unit 130 also decrypts a data frame received from the wireless-USB PHY unit 132. The wireless-USB MAC unit 130 further analyzes the thus-decrypted data frame. The wireless-USB MAC unit 130 filters a portion of the data obtained from the data frame, the portion being data to be passed to an upper layer protocol.

The wireless-USB PHY unit 132 performs signal processing, such as frequency conversion. The wireless-USB PHY unit 132 is configured to include a radio frequency (RF) unit 1321, the PHY/RF register 1322, and a baseband unit 1325 so as to perform the signal processing. The baseband unit 1325 includes a transmitting unit 1326 and a receiving unit 1327.

The RF unit 1321 performs MB-OFDM modulation of a baseband signal fed from the transmitting unit 1326 of the baseband unit 1325. The RF unit 1321 sends out the thus-modulated signal over the air via the wireless USB antenna 134 by radio waves. The wireless USB antenna 134 transmits and receives radio waves by wireless USB. The RF unit 1321 also demodulates a signal that is undergone MB-OFDM modulation and received by the wireless USB antenna 134 into a baseband signal. The RF unit 1321 outputs the thus-demodulated baseband signal to the receiving unit 1327 of the baseband unit 1325.

The transmitting unit 1326 of the baseband unit 1325 generates an analog baseband signal by performing digital-to-analog (D/A) conversion of a digital data frame transmitted from the wireless-USB MAC unit 130 via the WiMedia MAC-PHY-interface bus 136. The transmitting unit 1326 feeds the thus-generated baseband signal to the RF unit 1321.

The receiving unit 1327 of the baseband unit 1325 generates a digital data frame by performing analog-to-digital (A/D) conversion of the baseband signal fed from the RF unit 1321. The receiving unit 1327 transmits the thus-generated data frame to the wireless-USB MAC unit 130 via the WiMedia MAC-PHY-interface bus 136.

The NFC MAC unit 140, the NFC PHY unit 142, and the NFC antenna 144 perform operations related to communication by NFC. Each of the NFC MAC unit 140, the NFC PHY unit 142, and the NFC antenna 144 performs operations similar to that performed by the wireless-USB MAC unit 130, that performed by the wireless-USB PHY unit 132, and that performed by the wireless USB antenna 134, respectively. The NFC antenna 144 transmits and receives radio waves by NFC.

FIG. 8 is a functional block diagram of the wireless communication unit 12 illustrated in FIG. 2. A wireless-USB communication unit 160 includes a wireless-USB-protocol control unit 161 and a wireless-USB-host signal-processing unit 162. The wireless-USB-protocol control unit 161 controls protocols that perform generation of a data frame to be transmitted and analysis of a received data frame in data communication by using the wireless USB technology. The wireless-USB-host signal-processing unit 162 performs conversion between digital data and analog signals for wireless USB.

An NFC communication unit 170 includes an NFC-protocol control unit 171 and an NFC-signal processing unit 172. The NFC-protocol control unit 171 performs generation of a data frame to be transmitted and analysis of a received data frame in association by NFC. The NFC-signal processing unit 172 performs conversion between digital data and analog signals for NFC.

Figure 9:
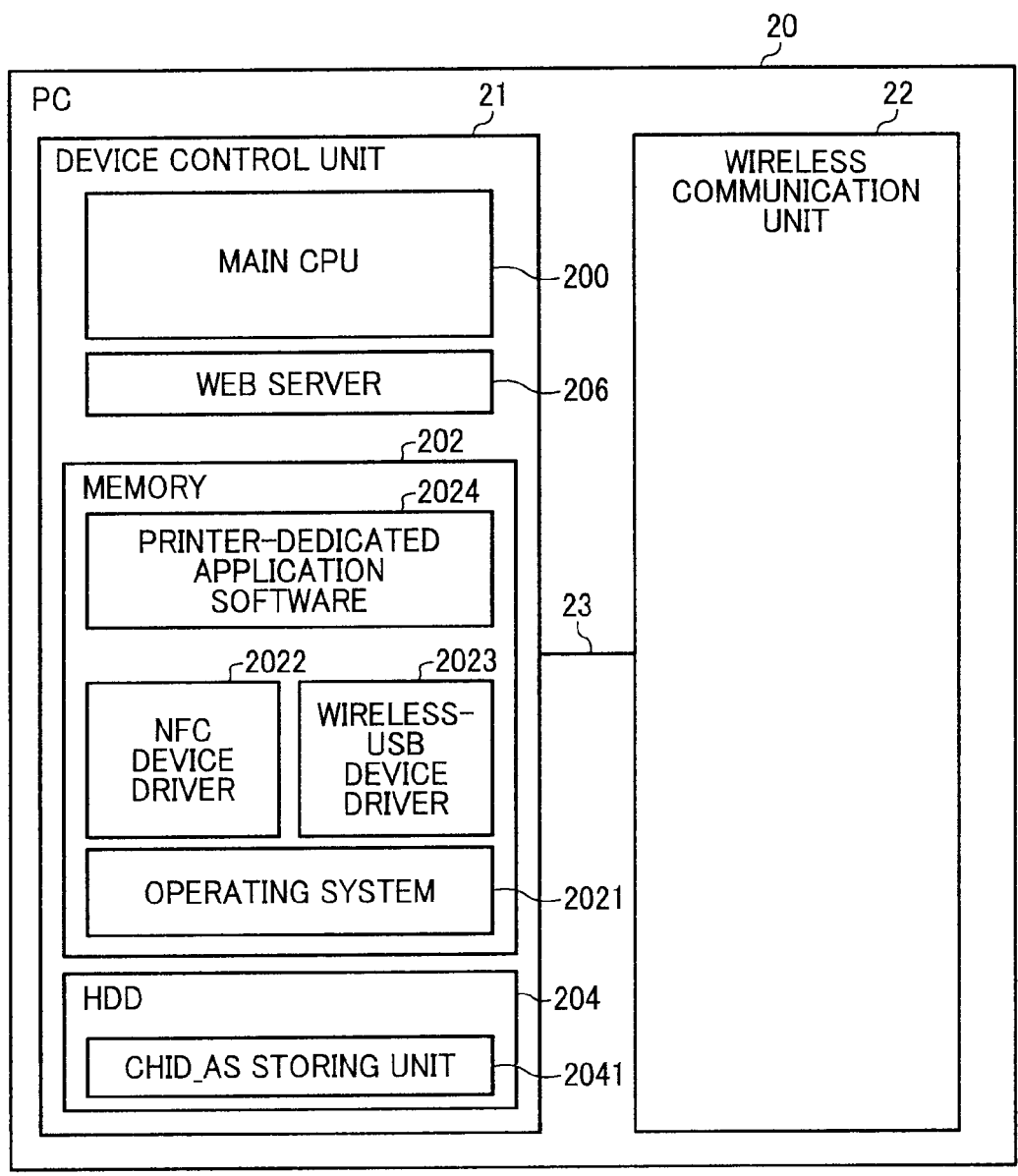
FIG. 9 is a schematic diagram illustrating a main hardware configuration of a PC 20.

FIG. 9 is a schematic diagram illustrating a main hardware configuration of the PC 20. As with the printer 10, the PC 20 includes a device control unit 21 and a wireless communication unit 22. The device control unit 21 and the wireless communication unit 22 are connected to each other via a bus 23. The configuration of the wireless communication unit 22 is similar to the configuration of the wireless communication unit 12. As with the printer 10, the device control unit 21 includes a main CPU 200, a memory 202, an HDD 204, and a Web server 206.

The HDD 204 is provided to store OS 2021, an NFC device driver 2022, a wireless-USB device driver 2023, printer-dedicated application software 2024, and the like. The HDD 204 also stores a CHID. The HDD 204 includes a CHID_AS storing unit 2041 that stores a CHID_AS issued by the printer 10. The Web server 206 responds to an access made via a Web browser by a requesting user that uses the printer. Put another way, the Web server 206 functions as an input receiving unit that receives an input entered by the requesting user.

In the device control unit 21, the memory 202 stores the printer-dedicated application software 2024 in addition to the OS 2021, the NFC device driver 2022, and the wireless-USB device driver 2023. The printer-dedicated application software 2024 is fed from the printer 10.

Upon receiving an association-dedicated CHID, i.e., CHID_AS, from the printer 10, the printer-dedicated application software 2024 stores the CHID_AS in the CHID_AS storing unit 2041 in the HDD 204. The NFC device driver 2022 reads the CHID_AS from the HDD 204 in the association process. The NFC device driver 2022 outputs the CHID_AS together with a CHID when transmitting the CHID in a later step of the association process.

A communication process performed by the notebook PC 23 corresponding to the wireless USB host and the printer 10 corresponding to the wireless USB device will be described below. To allow the wireless USB host and the wireless USB device to carry out data communication therebetween, it is necessary that the wireless USB host and the wireless USB device are transitioned to a mutually authenticated state.

Figure 10:
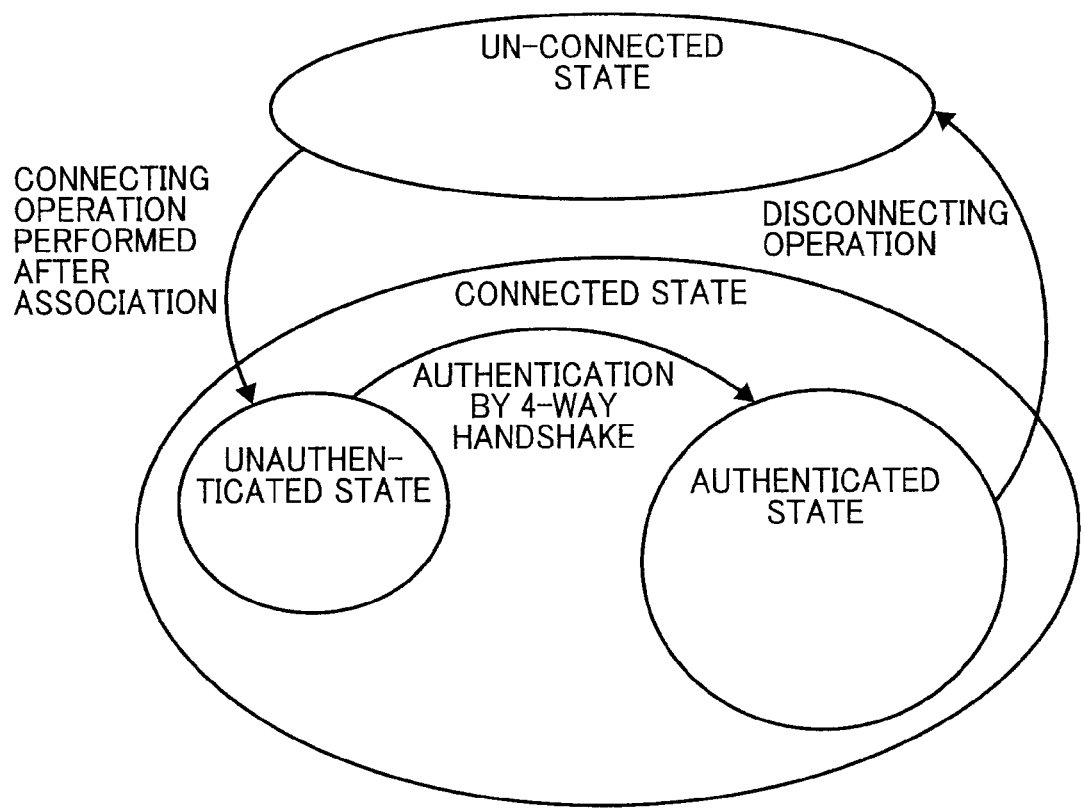
FIG. 10 is a state transition diagram in communication between a wireless USB host and a wireless USB device.

State transition, over which a wireless USB device is connected to a wireless USB host and thus transitioned to an authenticated state, is defined in the wireless USB 1.0 specification. FIG. 10 is a state transition diagram in communication between a wireless USB host and a wireless USB device. The state transition diagram illustrated in FIG. 10 is a simplified version of the state transition diagram given in the wireless USB 1.0 specification.

As illustrated in FIG. 10, the wireless USB device, which is in an un-connected state with respect to the wireless USB, host, establishes association with the wireless USB host, to which the wireless USB device attempts to connect. Thereafter, the wireless USB device performs connecting operation in which the wireless USB device specifies a CHID of the wireless USB host that has been obtained in the association process. This causes the state to be transitioned from the non-connected state to a connected state. Note that at this point in time, the wireless USB host is not authenticated; put another way, in an unauthenticated state. Subsequently, 4-way handshake is performed, which causes the state to transition from the unauthenticated state to an authenticated state. After completion of the communication, disconnecting operation is performed, which causes the state to transition from the connected state to the un-connected state.

In the wireless communication system 1 according to the present embodiment, CHID_AS authentication is performed in the association process that is performed for transition from the non-connected state to the connected state, thereby it is verified that a user of the PC 20 is an authorized user. Furthermore, as a pre-processing of this operation, CHID_AS sharing operation is performed. The CHID_AS sharing operation causes the printer 10 and the PC 2) to share a same CHID_AS.

Figure 11:
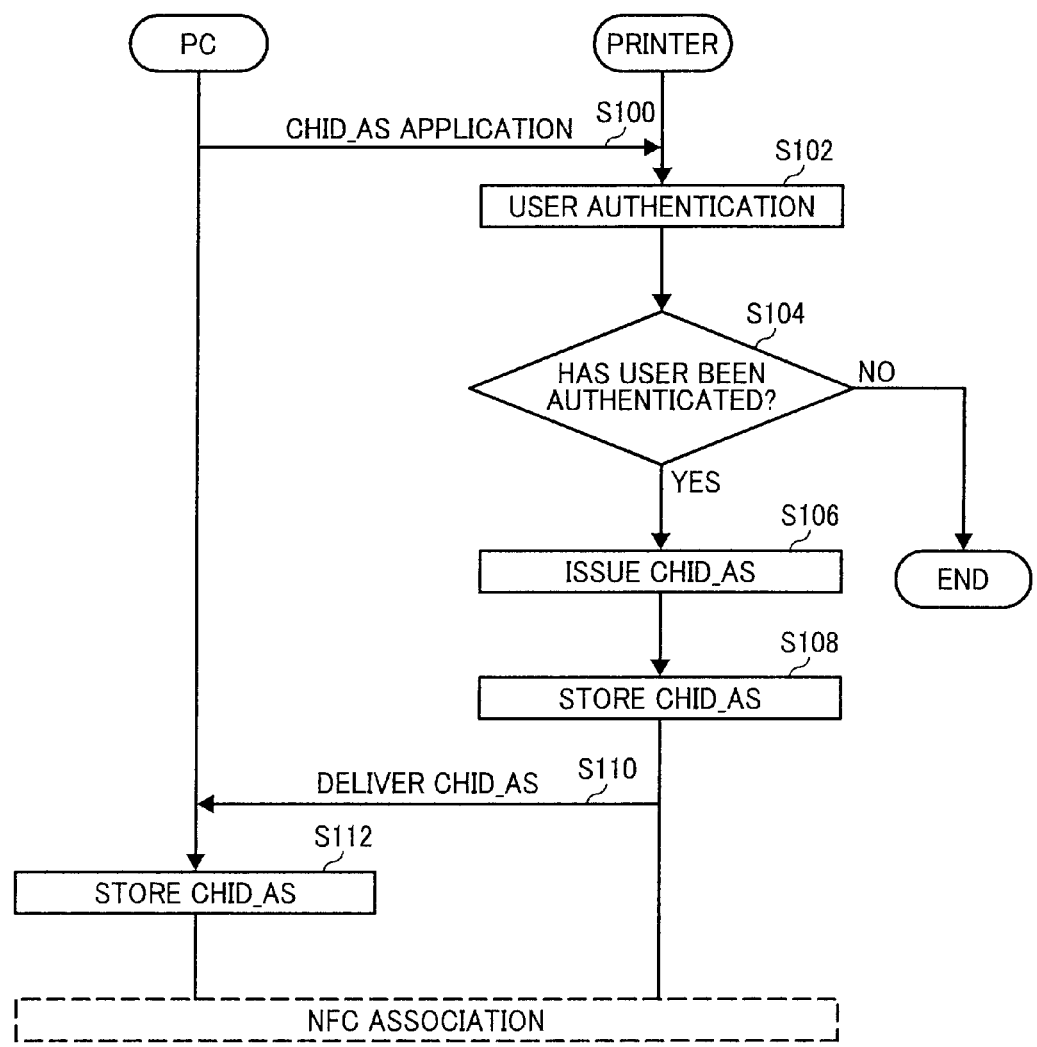
FIG. 11 is a message sequence chart of a CHID_AS sharing operation.

FIG. 11 is a message sequence chart of the CHID_AS sharing operation. In a CHID_AS sharing operation, when a requesting user of the PC 20 desires to use the printer 10, or, in other words, desires to carry out communication between the printer 10 and the PC 20, the requesting user makes an access to the Web server 206 via a Web browser to transmit CHID_AS application information to the printer 10 via the wireless USB antenna of the wireless communication unit 22 (Step S100). The CHID_AS application information contains a user ID and a password of the requesting user that are entered by the requesting user. Upon receiving the user ID and the password thus entered by the requesting user, the PC 20 transmits the CHID_AS application information to the printer 10.

In the PC 20, upon receiving the CHID_AS application information via the wireless USB antenna 134, the Web server 114 performs user authentication in cooperation with the user information server 110 (Step S102). Specifically, the user authentication unit 1101 of the user information server 110 compares a combination of the user ID and the password of the requesting user contained in the CHID_AS application information with a combination of a user ID and a password that are stored in the user-ID storing unit 1041 so as to be associated with each other, thereby determining whether the requesting user is an authorized user. In other words, if the combinations of the user IDs and the passwords match, the user authentication unit 1101 determines that the requesting user is authenticated; if the combinations of the user ID and the password do not match, the user authentication unit 1101 determines that the requesting user is not authenticated.

An update operation, such as addition, deletion, and/or modification, of a user ID and the like to, from, and/or in the user-ID storing unit 1041 is performed according to an instruction from an administrator prior to a start of the CHID_AS sharing operation.

If the requesting user is authenticated by the user authentication unit 1101 (Yes at Step S104), the CHID_AS issuing unit 1121 of the CHID service program 112 issues a new CHID_AS (Step S106). Specifically, the user authentication unit 1101 passes a positive result of the authentication to the CHID service program 112. Upon receiving the positive result of the authentication, the CHID_AS issuing unit 1121 of the CHID service program 112 issues the new CHID_AS. Note that a CHID_AS index number of the CHID_AS issued at Step S106 is a number obtained by incrementing by one a CHID_AS index number of a CHID_AS issued by the CHID_AS issuing unit 1121 immediately before. In this way, a CHID_AS contains information for identification of the CHID_AS. Meanwhile, the CHID_AS issued at Step S106 contains a user ID of the requesting-user, which is contained in the CHID_AS application information.

The CHID_AS issuing unit 1121 further stores the thus-issued CHID_AS in the CHID_AS-list storing unit 1042 of the HDD 104 with the CHID_AS associated with the user ID of the requesting-user (Step S108). The CHID_AS issued by the CHID_AS issuing unit 1121 is transmitted to the PC 20 via the wireless USB antenna 134 (Step S110).

In the PC 20, upon receiving the CHID_AS via the wireless USB antenna of the wireless communication unit 22, the printer-dedicated application software 2024 in the memory 202 stores the thus-received CHID_AS in the CHID_AS storing unit 2041 in the HDD 204 as one file according to an instruction from the user (Step S112). To this end, a predetermined folder in the HDD is designated to the printer-dedicated application software 2024. The predetermined folder is a folder, from which the CHID_AS is to be read out by the NFC device driver 2022 in NFC association process. Because the folder has been designated in this manner, it is allowed to store a CHID_AS only by operating the printer-dedicated application software 2024 without being concerned about which folder is to be selected.

The operations discussed above allow the PC 20 and the printer 10 to share a same CHID_AS. When the CHID_AS sharing has been completed, association by NFC is subsequently performed.

Figure 12:
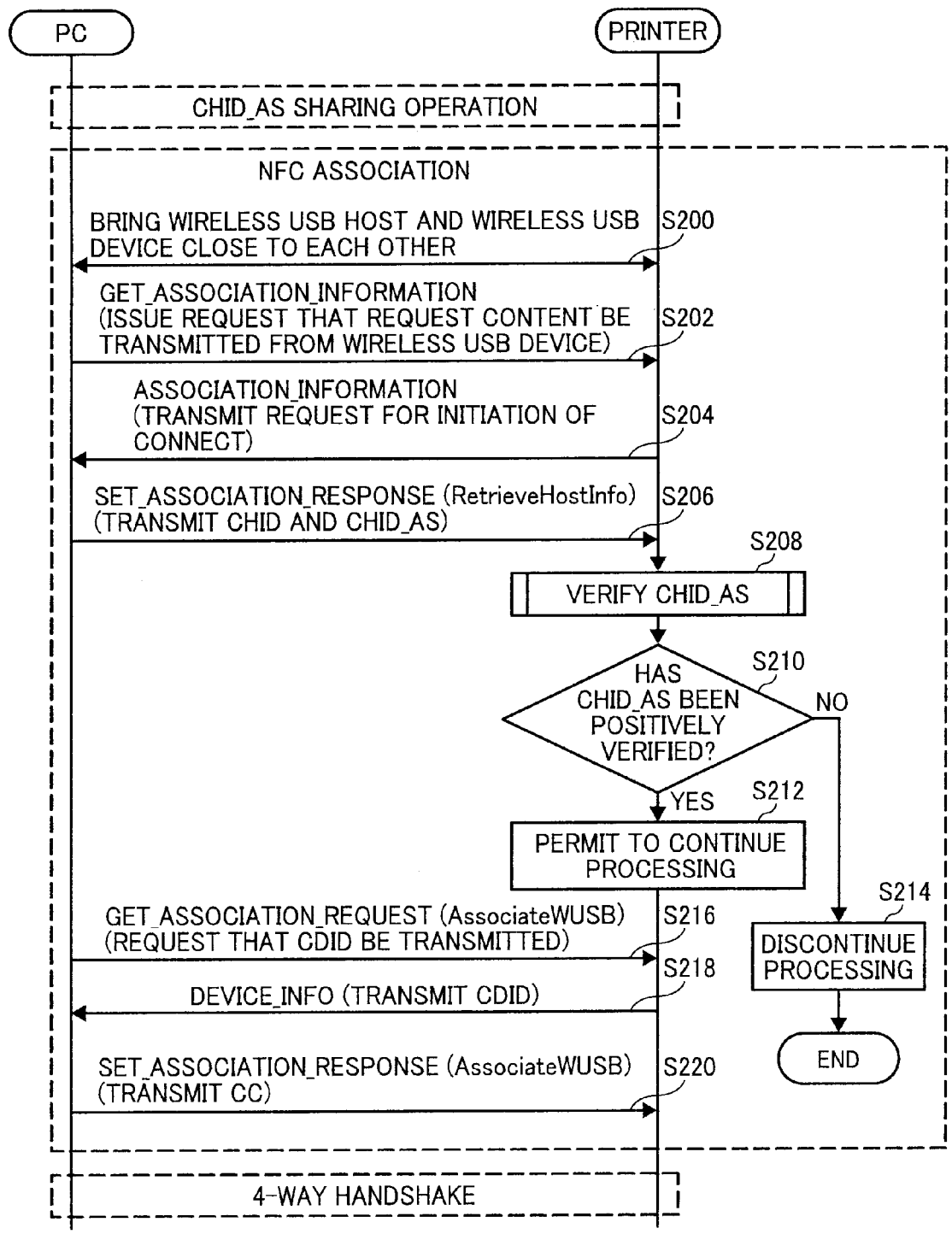
FIG. 12 is a message sequence chart of NFC association process.

FIG. 12 is a message sequence chart of the NFC association process between the printer 10 and the PC 20. Format for data passing between a wireless USB host and a wireless USB device in the NFC association is defined in the association specification. In the association process, in conformance with the association specification, a device request is exchanged between the wireless USB host and the wireless USB device, causing the wireless USB host and the wireless USB device to share a CC.

First, the printer 10 and the PC 20 are brought close to each other at a distance of ten centimeters (cm) or less (Step S200). This causes the printer 10 and the PC 20 to detect each other. Subsequently, the PC 20 sends out a GET_ASSOCIATION_INFORMATION device request (Step S202). This requests that request content be transmitted from the printer 10. In response to the GET_ASSOCIATION_INFORMATION device request, the printer 10 returns ASSOCIATION_INFORMATION to the PC 20 (Step S204). ASSOCIATION_INFORMATION is a request for initiation of connect.

Subsequently, the PC 20 sends out a SET_ASSOCIATION_RESPONSE device request (Step S206). RetreiveHostInfo, which indicates that CHID is stored in the PC 20, is set in a parameter of SET_ASSOCIATION_RESPONSE in advance. Based on this, the CHID is transmitted. Simultaneously, the CHID_AS stored in the CHID_AS storing unit 2041 in the CHID_AS sharing operation is also sent out.

In the printer 10, upon receiving the CHID and the CHID_AS, the CHID service program 112 verifies the CHID_AS first (Step S208). This CHID_AS verification is performed by comparing the CHID_AS received by the Web server 206 from the PC 20 with the CHID_AS stored in the CHID_AS-list storing unit 1042 of the printer 10. If the two CHID_ASs match, the CHID service program 112 determines that the CHID_AD is verified; if the two CHID_ASs do not match, the CHID service program 112 determines that the CHID_AD is not verified.

If the CHID_AS is verified (Yes at Step S210), the NFC device driver 1022 of the printer 10 permits to continue the NFC association process (Step S212). In contrast, if the CHID_AS is not verified (No at Step S210), the NFC device driver 1022 prohibits continuance of the NFC association process, and terminates the NFC association process (Step S214), by which processing for establishing communication between the printer 10 and the PC 20 is ended.

If continuance of the NFC association is permitted, the printer 10 receives a GET_ASSOCIATION_REQUEST device request from the PC 20 (Step S216). In GET_ASSOCIATION_REQUEST, AssociateWUSB, which tells that a request for a CDID is to be made, is set in a parameter. Accordingly, a request for transmission of a CDID is performed. In response thereto, the printer 10 reads out its own CDID from the HDD 104, and returns DEVICE_INFO that contains this CDID to the PC 20 (Step S218).

The PC 20 sends out a SET_ASSOCIATION_RESPONSE device request (Step S220). The SET_ASSOCIATION_RESPONSE contains a CC that contains the CHID, the CDID, and a CK. AssociateWUSB, which tells that the CC is contained, is set in a parameter of SET_ASSOCIATION_RESPONSE. Accordingly, the CC is transmitted from the PC 20 to the printer 10, thereby allowing 4-way handshake to be executed. At this time, the CK is pre-stored in HDD of the printer 10 and that in the PC 20.

In a sequence of conventional association process steps, upon receiving a CHID from a wireless USB host, a wireless USB device continues the association process without verifying whether the CHID is an authorized one. This makes it possible to establish communication between the wireless USB device and the wireless USB host even when a user of the wireless USB host, in which operation for transmitting the CHID has been performed, is an unauthorized user.

In contrast, in the wireless communication system 1 according to the present embodiment, the PC 20, which corresponds to a wireless USB host, and the printer 10, which corresponds to a wireless USB device, store a same CHID_AS prior to start of the association process. In the association process, comparison between the CHID_ASs stored in the PC 20 and the CHID_AS stored in the printer 10 is performed. If the CHID_ASs match, the association process is continued; if the CHID_ASs do not match, it is determined that a user that is requesting connection is an unauthorized user, and the association process is discontinued at once. Accordingly, the wireless communication system 1 according to the present embodiment can prevent such an undesirable situation that association is completed based on a CHID transmitted by an operation made by an unauthorized user, establishing communication between a wireless USB host and a wireless USB device.

Figure 13:
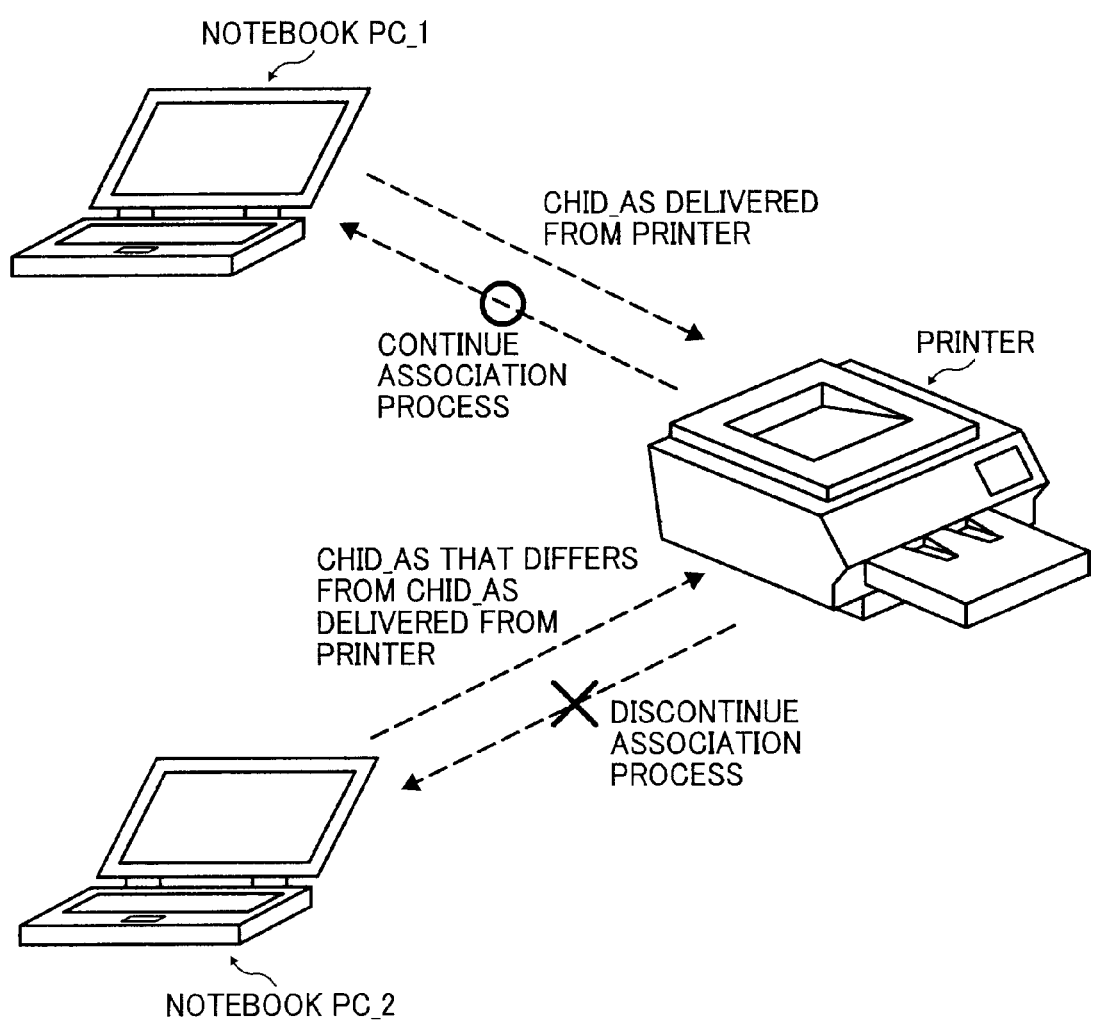
FIG. 13 is a schematic diagram illustrating operations performed for verification of a CHID_AS.

For instance, assume that a CHID_AS sent out from a notebook PC_1, which corresponds to the wireless USB host, is identical with a CHID_AS fed from a printer, which corresponds to the wireless USB device, as illustrated in FIG. 13. In this case, it is allowed to continue an association process between the notebook PC_1 and the printer. By contrast, assume that a CHID_AS transmitted from a notebook PC_2, which corresponds to the wireless USB host, is not identical with the CHID_AS fed from the printer. In this case, it is not allowed to continue an association process between the notebook PC_2 and the printer, and the process is terminated immediately.

Figure 14:
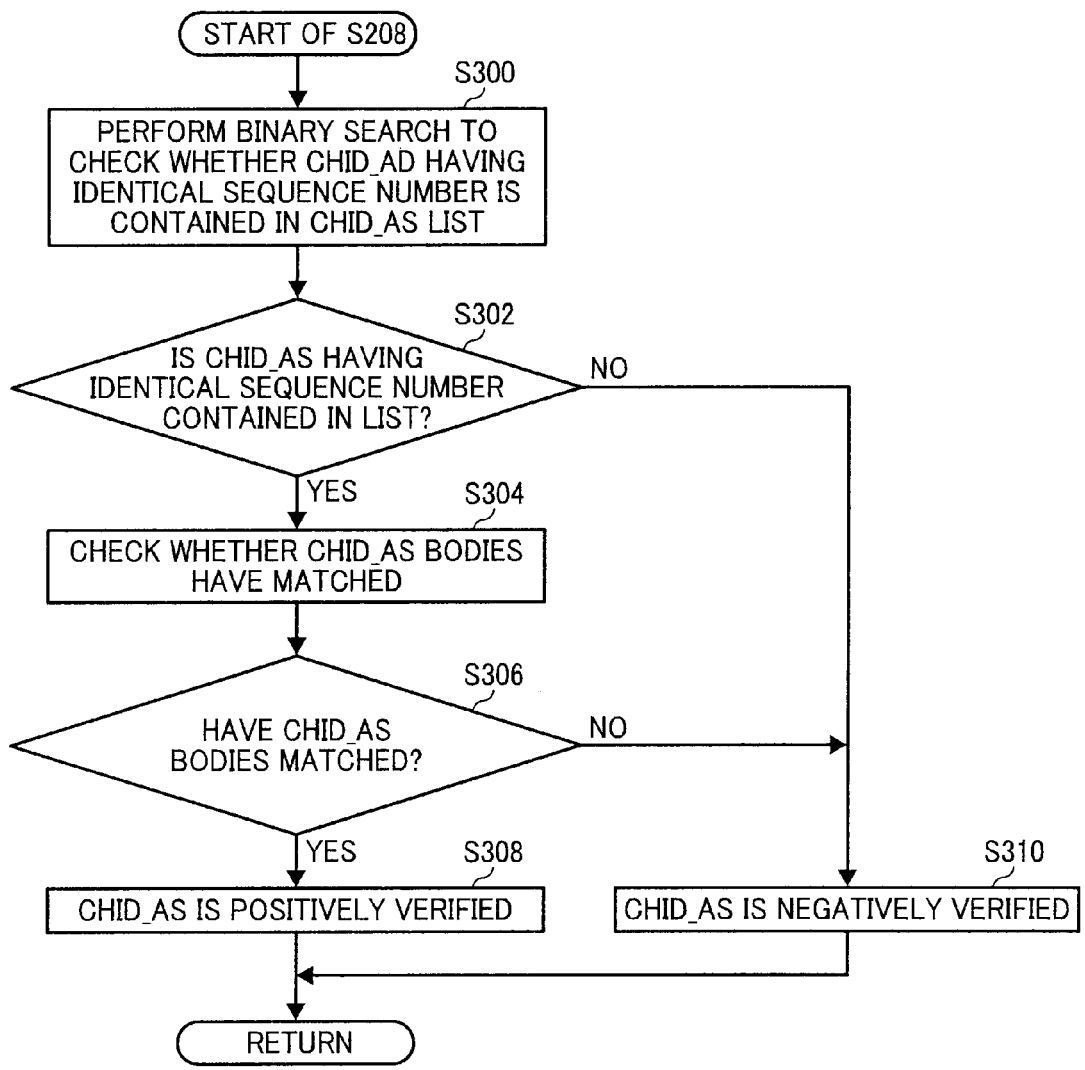
FIG. 14 is a flowchart illustrating operations in CHID_AS verification process (Step S208) performed by a CHID_AS verifying unit 1122 of the printer 10 in detail.
Figure 15:
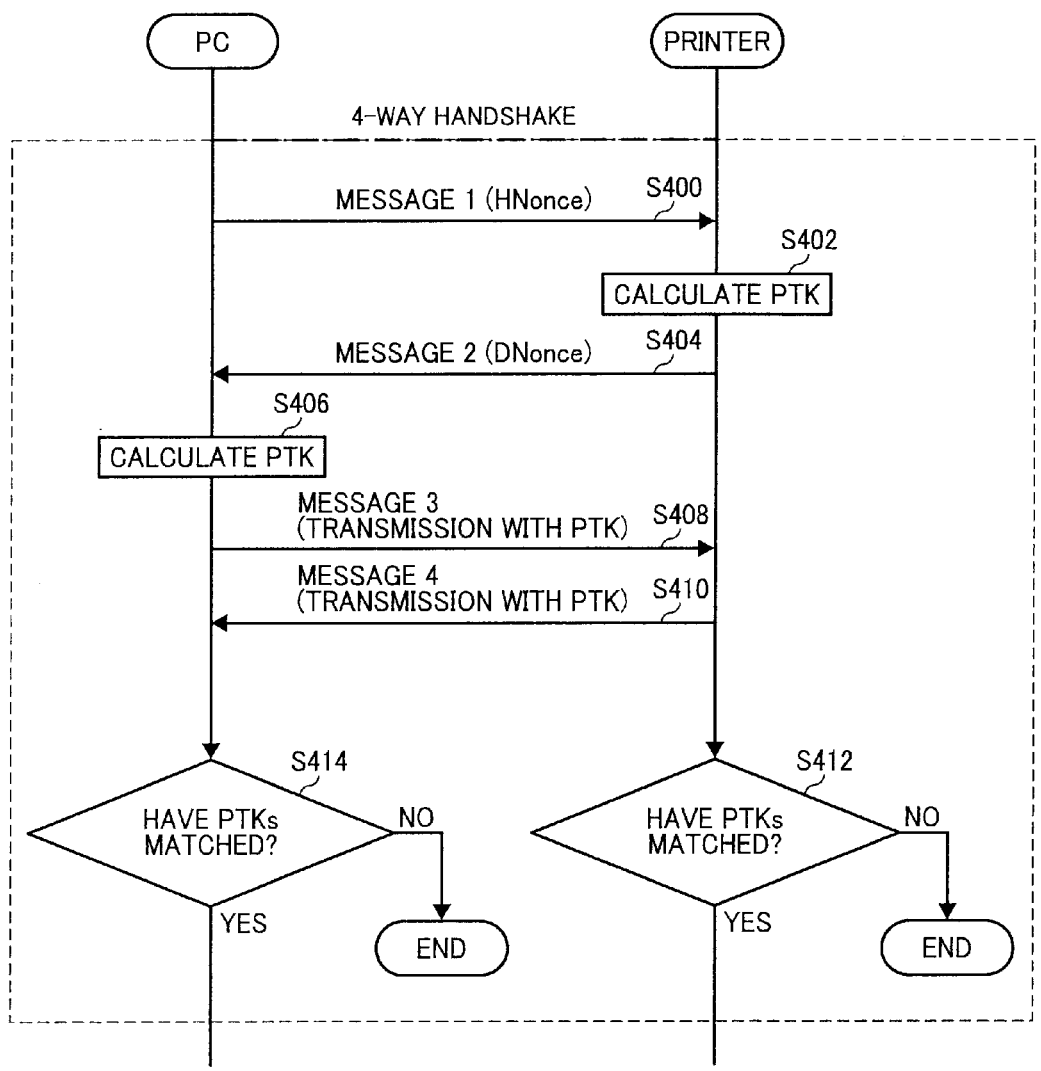
FIG. 15 is a message sequence chart of operations performed for conventional 4-way handshake.

FIG. 14 is a flowchart illustrating operations in the CHID_AS verification process (Step S208) performed by the CHID_AS verifying unit 1122 of the printer 10 in detail. In the CHID_AS verification, the CHID_AS verifying unit 1122 checks whether a CHID_AS, of which CHID_AS index number is identical with a CHID_AS index number of the CHID_AS received from the PC 20, is stored in a CHID_AS list in the CHID_AS-list storing unit 1042 (Step S300). Specifically, this check is performed by performing binary search for the CHID_AS index number.

If a CHID_AS having the same CHID_AS index number is stored in the CHID_AS-list storing unit 1042 (Yes at Step S302), comparison between 100 bits corresponding to a CHID_AS body of the CHID_AS that is stored in the CHID_AS-list storing unit 1042 and found at Step S300 and 100 bits corresponding to a CHID_AS body of the CHID_AS received from the PC 20 is performed (Step S304). If the CHID_AS bodies match (Yes at Step S306), the CHID_AS verifying unit 1122 determines that the CHID_AS is verified (Step S308).

In contrast, if the CHID_AS index numbers do not match at Step S302 (No at Step S302), or if the CHID_AS bodies do not match at Step S306 (No at Step S306), the CHID_AS verifying unit 1122 determines that the CHID_AS is not verified (Step S310). With one of the determinations, the CHID_AS verification process is completed.

By limiting targets of binary search to be performed first only to CHID_AS index numbers, which are relatively small in amount of data, as discussed above, volume of calculations to be performed for the search can be reduced. Put another way, simplification and speedup of the CHID_AS verification process can be achieved. Meanwhile, a CHID_AS according to the present embodiment contains a user ID. Accordingly, in a case where the CHID_AS is not verified, it is possible to identify the user who had performed the large amount of printing by combining the CHID_AS and log information related to printing together.

In the present embodiment, eight bits are allocated to each CHID_AS index number; however, any number of bits can be allocated. For instance, a configuration, in which the number of bits is optimally customized at shipment of equipment from a factory according to a scale of an environment where the equipment is to be used, can be employed.

In the present embodiment, it is assumed that NFC is employed as an association model; however, the Cable Association Model or the Numeric Association Model can be employed in place of the NFC Association Model. Even in this case, establishment of communication between a wireless USB host and a wireless USB device in response to an operation made by an unauthorized user can be prevented.

In the present embodiment, it is assumed that the wireless USB host and the wireless USB device are employed as the wireless host and the wireless USB device; however, the present invention is not limited thereto.

According to an aspect of the present invention, there is yielded an effect of restricting association to be established between a wireless USB host and a wireless USB device when an instruction for establishing association is issued by a user, of the wireless USB host, that does not have an access right to the wireless USB device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication system comprising:
a wireless host that issues a request for wireless communication; and
a wireless device that receives the request, wherein
the wireless host includes a communication unit that transmits, before transmitting a communication request that requests wireless communication with the wireless device to the wireless device, a requesting-user ID for identification of a requesting user that is using the wireless host,
the wireless device includes:
a communication unit that receives the requesting-user ID from the wireless host;
a user-ID storing unit that stores a user ID of a user that is permitted to establish communication with the wireless device;
a user authentication unit that authenticates the requesting user based on a result of comparison between the requesting-user ID received by the communication unit of the wireless device and the user ID stored in the user-ID storing unit; and
an information required prior to connection storing unit that stores, when the requesting user is authenticated by the user authentication unit, information required prior to connection that includes at least the requesting-user ID and indicates that the requesting user is authenticated by the user authentication unit,
when the requesting user is authenticated by the user authentication unit, the communication unit of the wireless device transmits the information required prior to connection to the wireless host,
the communication unit of the wireless host transmits the information required prior to connection to the wireless device in an association process for wireless connection with the wireless device,
the wireless device further includes an information required prior to connection verifying unit that compares the information required prior to connection received by the wireless device and the information required prior to connection stored in the information required prior to connection storing unit, and
when the information required prior to connection received by the wireless device and the information required prior to connection stored in the information required prior to connection storing unit match, the communication unit of the wireless device continues the association process with the wireless host.

2. The wireless communication system according to claim 1, wherein when the information required prior to connection received by the wireless device and the information required prior to connection stored in the information required prior to connection storing unit do not match, the communication unit of the wireless device discontinues the association process with the wireless host.

3. The wireless communication system according to claim 1, wherein the association process is a process in compliance with communication standard for near field association model.

4. The wireless communication system according to claim 1, wherein
the wireless host further includes an input receiving unit that receives an input entered by the requesting user, and
the communication unit of the wireless host transmits the requesting-user ID to the wireless device when the input receiving unit receives an input that requests the information required prior to connection, the input being entered by the requesting user.

5. The wireless communication system according to claim 1, wherein
the wireless host further includes an information required prior to connection storing unit that stores the information required prior to connection, and
the communication unit of the wireless host transmits the information required prior to connection stored in the information required prior to connection storing unit of the wireless host to the wireless device.

6. The wireless communication system according to claim 1, wherein the information required prior to connection contains an authentication ID for identification of an authentication operation performed by the user authentication unit.

7. The wireless communication system according to claim 1, wherein the information required prior to connection contains a host ID for identification of the wireless host.

8. The wireless communication system according to claim 7, wherein the host ID is information that is for use in the association process and that differs from another host ID that is information for identification of the wireless host.

9. The wireless communication system according to claim 1, wherein the information required prior to connection contains the requesting-user ID.

10. The wireless communication system according to claim 1, wherein the wireless device further includes an updating unit that adds, deletes, and modifies a user ID to, from, and in the user-ID storing unit according to an instruction issued by a system administrator by using a Web server function.

11. The wireless communication system according to claim 1, wherein the wireless device further includes an input receiving unit that receives an input entered by a system administrator, and when the input receiving unit receives an input that requests the information required prior to connection, the communication unit of the wireless device requests the wireless device to pass the information required prior to connection, and, when the information required prior to connection received by the wireless device and the information required prior to connection stored in the information required prior to connection storing unit match, the communication unit continues the association process with the wireless host.

12. The wireless communication system according to claim 1, wherein the wireless host is a wireless USB host that issues the request for wireless communication in compliance with wireless USB standard;

the wireless device is a wireless USB device;

the information required prior to connection is wireless USB host identifying information;

the information required prior to connection storing unit is a wireless USB host identifying information storing unit; and the information required prior to connection verifying unit is a wireless USB host identifying information verifying unit.

13. A wireless host that issues a request for wireless communication to a wireless device, the wireless host comprising:

a communication unit that transmits, before transmitting a communication request that requests wireless communication with the wireless device to the wireless device, a requesting-user ID for identification of a requesting user that is using the wireless host; and an information required prior to connection storing unit that stores, when the communication unit receives an information required prior to connection that includes at least the requesting-user ID and indicates that the requesting user has been authenticated by a user authentication unit from the wireless device, the information required prior to connection, wherein the communication unit transmits the information required prior to connection to the wireless device in an association process for wireless connection with the wireless device, and when continuance of the association process is permitted by the wireless device, the communication unit continues the association process.

14. A wireless device that receives a request for wireless communication from a wireless host, the wireless device comprising:

a communication unit that receives a requesting-user ID for identification of a requesting user that uses the wireless host from the wireless host;

a user-ID storing unit that stores a user ID of a user that is permitted to establish communication with the wireless device;

a user authentication unit that authenticates the requesting user based on a result of comparison between the requesting-user ID received by the communication unit and the user ID stored in the user-ID storing unit; and an information required prior to connection storing unit that stores, when the requesting user is authenticated by the user authentication unit, information required prior to connection that includes at least the requesting-user ID and indicates that the requesting user has been authenticated by the user authentication unit, wherein when the requesting user is authenticated by the user authentication unit, the communication unit transmits the information required prior to connection to the wireless host, the wireless device further includes an information required prior to connection verifying unit that compares the information required prior to connection received by the wireless device and the information required prior to connection stored in the information required prior to connection storing unit in an association process for wireless connection with the wireless host, and when the information required prior to connection received by the wireless device and the information required prior to connection stored in the information required prior to connection storing unit match, the communication unit continues the association process with the wireless host.

* * * * *